R. WHITE.
Revolver.
No. 1,802.
Reissued Oct. 25, 1864.
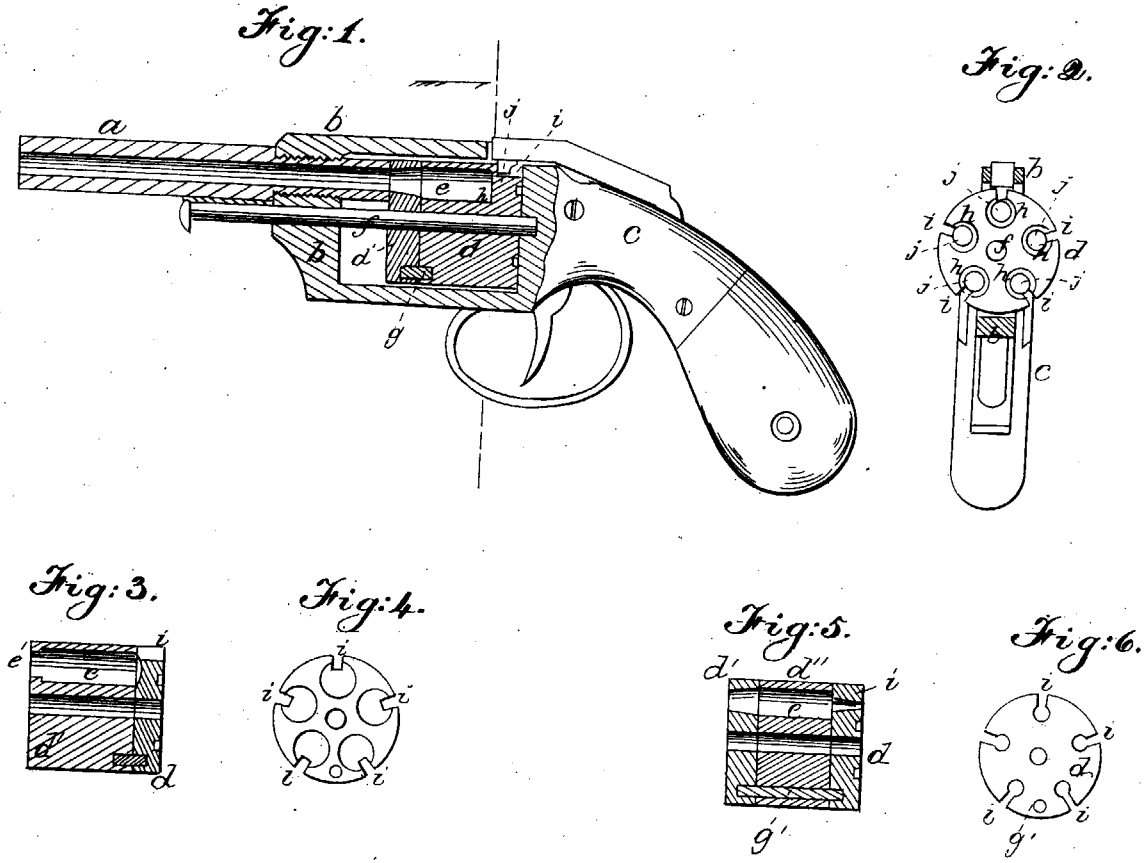
Witnesses
A. DeLacy
J. J. Keagle
R. Allen White
N. PETERS, PHOTO-LITHOGRAPHER, WASHINGTON, D. C.

UNITED STATES PATENT OFFICE.

ROLLIN WHITE, OF SPRINGFIELD, MASSACHUSETTS.

IMPROVEMENT IN REVOLVING FIRE-ARMS.

Specification forming part of Letters Patent No. 19,961, dated April 13, 1858; Reissue No. 1,802, dated October 25, 1864.

*To all whom it may concern:*

Be it known that I, ROLLIN WHITE, formerly of Hartford, in the State of Connecticut, but now of Springfield, in the State of Massachusetts, have invented a new and useful Improvement in Repeating Fire-Arms; and I do hereby declare that the following is a full, clear, and exact description thereof, reference being had to the accompanying drawings, making part of this specification, in which—

Figure 1 is a longitudinal section of a pistol on my improved plan, and Fig. 2 a cross-section thereof; Fig. 3, a longitudinal section of the cylinder, representing a modification, and Fig. 4 a cross-section thereof; and Figs. 5 and 6, longitudinal and cross-sections of another modification.

My said invention relates to an improvement in that class of repeating fire-arms consisting of a fixed barrel combined with a cylinder having a series of parallel chambers which are in succession brought in line with the barrel to be fired. In such arms it is important that the chambered cylinder should rotate freely and not be liable to bind by the expansion of the metal when heated by the firing of the successive charges. To secure the required freedom a certain amount of play must be given to the chambered cylinder between the rear end of the fixed barrel and the breech or recoil-shield back of the cylinder, and this amount of play at the time of the discharge leaves an open space for the escape of gas at the junction of the cylinder with the rear end of the barrel, because the force of the discharge, acting against the rear end of the chamber, forces the cylinder back from the barrel and against the breech or recoil-shield, which escape of gas reduces the force of the discharge and is otherwise seriously objectionable.

Prior to my said invention various plans were devised to prevent this windage; but all of them, so far as I am informed, required a mechanism to push the cylinder against the rear end of the barrel after it had been rotated, and to hold it in such position during the discharge to resist the recoil, and to liberate it after firing a load, that it might be turned freely to bring another chamber in line with the barrel. The use of such mechanism was seriously objectionable. In arms of this class using cased cartridges provided with fulminate priming at the rear end to be exploded by the lock, it is essential to success that the cartridges should be held back in the chambers, so that the fulminate priming in the rear end of the cartridge should be in reach of to be fired by the lock.

The object of my said invention is to accomplish the desirable result of stopping the windage at the junction of the cylinder with the rear end of the barrel without the use of any such mechanism, and to hold back the cartridges, that their rear end carrying the fulminate priming may be in the proper position to be exploded by the lock; and my said invention consists in making the many-chambered cylinder with the bore of each chamber cylindrical, or nearly so, to within a short distance of the front end, which is formed with a contraction sufficient to slug the ball, and also in combining the chambers so formed with the making of the cylinder in two or more parts so connected that they shall rotate together and be free to separate from each other longitudinally. From such construction it will result that cylindrical cased cartridges can be used, which will properly and yet freely fit the chambers and close up the seam or seams at the junction of the two or more parts of the cylinder, if made in two or more parts, to prevent the escape of gas or fire; that the contraction at the front end will hold the cartridges back in the chambers, so that the fulminate priming at the rear end of the cartridge shall be in the proper position to be fired by the lock, and that the forward end of the cylinder will be carried forward in close contact with the rear end of the fixed barrel by the force of the ball acting against the contraction of the bore at the forward end of the chambers; and my said invention also consists in extending the chambers entirely through the cylinder, so combined with a stationary barrel, in combination with the breech-plate, made separate from, but which is so connected with the cylinder that the two shall rotate together to bring the chambers in line with the barrel and the priming in line with the hammer of the lock to be fired.

In the accompanying drawings, *a* represents the fixed barrel, secured in the usual manner to the front end of a metal frame, *b*, which contains the chambered cylinder, the said frame being in turn secured to or making part of the stock *c*. The cylinder *d*, with its series of chambers *e*, is mounted and turns on a central pin, *f*, within the frame *b* in the usual or in any appropriate manner, and it is to be turned to bring the several chambers in succession to the line of the barrel by any of the well-known mechanisms heretofore used or which may be devised for that purpose, none being represented, as this makes no part of my invention.

The cylinder *d* I prefer to make in two parts. When made in two parts, as represented in Fig. 1 of the accompanying drawings, the chambers are formed mainly in the part *d*, and of a cylindrical shape, and bored in from the front end, and the cartridges are to be inserted through the front end; and the forward portion, *d'*, has the bore of the several chambers extending through it of a tapering form—that is, at their junction with the rear part, *d*, of the cylinder they are to be of about the same caliber as the chambers in the said rear portion, *d*, and gradually reduced, so as to be of the same caliber with the bore of the barrel at the front end.

The two parts *d* and *d'* of the cylinder are to be connected by a cylindrical dowel-pin, *g*, or by equivalent means, so that they shall rotate together and be free longitudinally to separate from or approach each other; or the cylinder may be formed as represented in Fig. 3, the separation of the two parts *d* and *d'* being in a plane at the rear end of the chambers. In this example the chambers are made wholly in the front portion, *d'*, of the cylinder, and with the caliber cylindrical, or nearly so, from the rear end to within a short distance of the front end, where the caliber is reduced to that of the fixed barrel by a curved contraction, as represented at *e'*; and the two parts *d* and *d'* of the cylinder are to be connected by a dowel-pin or equivalent means, as in the first example, and for the same purpose. In this example the cartridges are to be inserted through the rear end of the part *d'* of the cylinder. The cylinder, however, may be made in three parts, as represented in Fig. 5, the rear portion, *d*, being, as in the second example, Fig. 3, separated in the plane of the rear end of the series of chambers. The chambers *e* are mainly in the middle portion, *d''*, and of a cylindrical form, and extended in the forward portion, *d'*, with a regular taper or with a curved contraction. In this third example the three parts of the cylinder are to be connected by a cylindrical dowel-pin, *g'*, or equivalent means, as in the other examples, and for the same purpose.

If it be desired to use only that part of my said invention which relates to making the breech-plate separate from but so connected with the cylinder that they shall rotate together, the chambers *g* may extend entirely through the cylinder, of a cylindrical form, or nearly so.

The cartridges to be used in this improved arm are the kind well known as "metallic" or "cased" cartridges with the fulminate at the rear end, and when made for the cylinder constructed according to example Fig. 1 the metallic or cased cartridge is to be made of sufficient length to extend forward of and to lap the junction of the two parts of the cylinder nearest the front end; and to explode such cartridges the cylinder may be made in various ways, in all of which a series of apertures, *i*, are made through the rear portion of the cylieder, one for each chamber, and communicating therewith, and of suitable form to receive the hammer of the lock or any equivalent therefor, that it may strike that portion of the cartridge which contains the fulminate priming thus held back by the contraction at the front end of the chambers. In Figs. 1 and 2 the rear end of each chamber is extended back in the form of an annular recess, *h*, to receive an annular flange of the cartridge which contains the fulminate. At the rear end of the chamber the solid metal of the rear portion of the cylinder forms a cylindrical plug, *j*, extending into the flange of the cartridge, and forming a bed or rest against which to explode the fulminate when the hammer or equivalent strikes it.

For the second example the fulminate should be in the rear end of the cartridge, made in the form of a segment of a sphere to resist the stroke of the hammer, the rear end of the chambers being made of a corresponding concave form; and a third mode is to form the rear end of the cartridge with a small central projection containing the fulminate, which is received in a small central recess at the bottom of the chamber, where it is struck by the hammer.

Any other suitable means for firing the charges may be substituted for the above modes.

As the bore of the chambers is cylindrical to within a short distance of the front end, they will properly receive and hold cylindrical cased cartridges, while the contraction at the front end will hold back the cartridges, so that the fulminate at the rear end will be reached by the hammer or equivalent to insure the firing; and as the bore of the chambers is of less diameter at the front than at the rear end, and the front end of the cylinder is free to separate from the breech, the ball, when being forced out, will act against the contraction at the front end and force it against the rear end of the fixed barrel, and thus prevent the escape of gas, while the case of the cartridge will prevent the escape of gas from the seams back of the junction of the cylinder and barrel.

By making the breech-plate separate from but so connected with the cylinder that the two shall rotate together, whatever may be the form of the chamber, it will afford ready access to the inside of the chambers for removing the cartridge-cases, for cleansing, and for other purposes, and specially for loading, if it be desirable to load from the rear, while at the same time it avoids all friction and liability to catch experienced in the use of a non-rotating breech.

What I claim as my invention, and desire to secure by Letters Patent, is—

1. Combining with a fixed barrel a many-chambered rotating cylinder, the chambers of which are made of a cylindrical form to within a short distance of the front end and there formed with a contraction of less caliber than the diameter of the ball, when such contracted front end is free to move longitudinally from the breech, substantially as and for the purpose specified.

2. In combination with the chambers formed with a contraction at the front end, substantially as specified, the making of the cylinder in two or more parts so connected that they shall rotate together and be free to separate longitudinally, substantially as and for the purpose specified.

3. The combination of a fixed barrel, a rotating cylinder having a series of chambers extended entirely through it, so placed and rotated that the several chambers may in succession be brought in line with the barrel, and a rotating breech-plate to close up the rear end of the chambers of the cylinder, and which is separable from, although it rotates with, the cylinder, substantially as and for the purpose specified.

ROLLIN WHITE.

Witnesses:
A. DE LACY,
ANDREW I. TODD.